A. L. SNOW, DEC'D.
G. C. SNOW, EXECUTOR.
SPRING.
APPLICATION FILED SEPT. 30, 1910.

997,867.

Patented July 11, 1911.

Witnesses:
Jas. E. Hutchinson
Tho. C. Heath

Inventor:
Arthur L. Snow, Deceased,
By T. Moncrieans Attorneys

UNITED STATES PATENT OFFICE.

ARTHUR L. SNOW, DECEASED, LATE OF KINGFISHER, OKLAHOMA, BY GRACE CUNNINGHAM SNOW, EXECUTOR, OF KINGFISHER, OKLAHOMA.

SPRING.

997,867.  Specification of Letters Patent.  Patented July 11, 1911.

Application filed September 30, 1910. Serial No. 584,775.

*To all whom it may concern:*

Be it known that ARTHUR L. SNOW, deceased, late a citizen of the United States, and resident of Kingfisher, in the county of Kingfisher and State of Oklahoma, did invent certain new and useful Improvements in Springs, of which the following is a specification, reference being had to the accompanying drawing.

This invention relates to an improvement in springs designed principally for use on vehicles and more particularly to the type of vehicle springs in which a primary spring is used to normally support the load and one or more supplemental springs are provided which are adapted to be brought into action successively to assist the primary spring in performing its functions.

The object of the present invention is a spring of this type in which a supplemental spring is provided which under normal conditions will move idly with the primary spring, but which when the primary spring is subjected to a predetermined compression will be brought into contact with a stop which will cause it to be brought into action to assist the primary spring.

A further object of the invention is the provision of a spring of this type which will effectively perform the functions for which it is designed and the various parts of which are so constructed that they can be economically manufactured and assembled.

In the accompanying drawings, several embodiments of the invention are illustrated but it will be understood that many changes may be made in the forms therein shown without departing from the spirit and scope of the appended claims.

Figure 1:
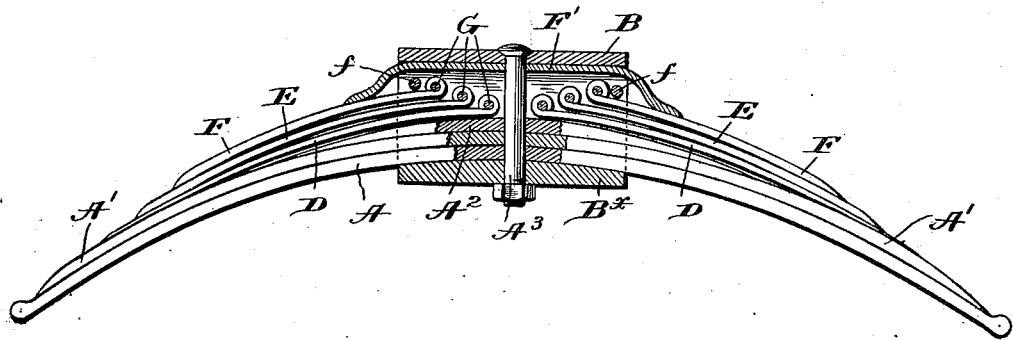

In the drawings, Figure 1 is a longitudinal section of a semi-elliptic spring constructed in accordance with the present invention, Fig. is a slightly modified form showing in longitudinal section the invention applied to an elliptic spring.

Referring now to the form of the invention illustrated in Fig. 1, A designates a continuous semi-elliptic spring, which lies between the side walls of a U-shaped saddle plate B. The spring A may be formed of one or more leaves, as desired, a reinforcing leaf A' being shown in the present instance and supported upon the upper surface of said reinforcing leaf intermediate the ends of the spring is a short steel plate $A^2$, the ends of which are tapered to merge into the upper surface of the leaf A'. A bolt $A^3$ serves to rigidly connect the elliptic spring A and the spring plate $A^2$ to the base of the saddle plate B, which base is composed of a detachable plate $B^x$ secured upon the lower edge of the sides of the U-shaped saddle as shown. Pivotally supported between the side walls of the saddle B are a plurality of supplemental spring members which are arranged in pairs, D, D, E, E, and F, F, the free ends of the supplemental spring members D, D, resting upon the upper surface of the elliptic spring A, and the free ends of the spring members E, E, resting upon the upper surfaces of the spring members D, D, and the free ends of the spring members F, F, resting upon the upper surfaces of the spring members E, E. The inner ends of all of the spring members terminate in loop portions which are formed integral therewith and the spring members are pivotally secured between the side walls of the saddle B by means of bolts G, which pass through the looped ends of the spring members. The several pairs of spring members are so positioned within the saddle B that the inner ends of the spring members E, E, constitute stops which serve to limit the movement of the spring members D, D, on their pivots, while the inner ends of the spring members F, F, constitute stops which serve to limit the movement of the spring members E, E, upon their pivot. The movement of the spring members F, F, on their pivots is limited by means of stops *f* which are positioned directly thereabove, said stops conveniently consisting of pins extending across the space between the side walls of the saddle B. Positioned within the upper portion of the saddle B, is a spring F', the ends of which bear upon the upper surface of the uppermost spring members F, F, said springs possessing just sufficient strength to hold all of the supplemental spring members against movement and prevent the same from rattling during the operation of the device.

In the operation of the spring above described, it will be seen that as long as the elliptic spring A is compressed to only a certain extent, the several pairs of supplemental spring members will merely turn idly on their pivots with the elliptic springs and will not be brought into supporting action at all. As soon, however, as the spring A has been compressed to a sufficient extent to cause the upper surfaces of the spring members D, D, to contact with the inner ends of the spring members E, E, said supplemental spring members D, D, will if the elliptic spring A is compressed to a further extent, be placed under tension and brought into action to assist the elliptic spring A in supporting the load. If the elliptic spring A is subjected to still further compression, the supplemental spring members E, E, and F, F will be successively brought into action in a like manner.

It will be seen that from the manner of positioning the supplemental springs, they will through contacting with their several stops be brought into action successively when the primary spring is subjected to compression.

Figure 2:
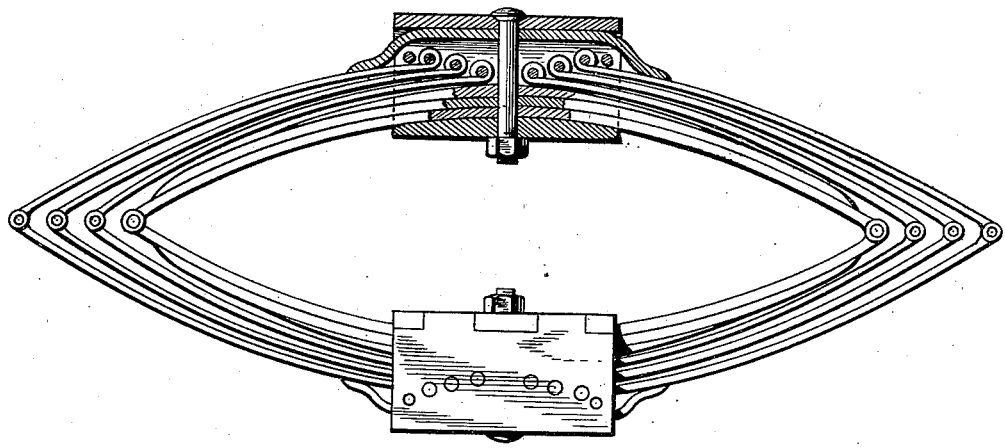

In Fig. 2 of the drawings, is illustrated a modified form of the invention, an elliptic spring being shown in this instance. The spring illustrated in this figure is similar in construction to that shown in Fig. 1 except that two continuous semi-elliptic primary springs are employed which are rigidly secured to saddle plates similar to those described in connection with Fig. 1, the ends of which are pivotally connected to each other, and that instead of employing a plurality of pairs of supplemental spring members, the free ends of which are supported upon the outer surface of the primary spring, the ends of the supplemental spring members of the upper section are extended beyond the outer ends of the primary spring and are pivotally connected to the outer ends of the corresponding spring members of the lower section of the spring, the inner ends of all of said supplemental spring members being secured to the saddle plates in the manner heretofore described in connection with Fig. 1. In this form, the supplemental springs act both upon compression and recoil.

Having thus described the invention, what is claimed is:—

1. In a device of the character described, a primary spring, a supporting member carried thereby, a supplemental spring pivoted to said supporting member and adapted to move idly with the primary spring for a predetermined distance, and a separate stop carried by said supporting member for limiting such movement of the supplemental spring.

2. In a device of the character described, a semi-elliptic spring, a supporting member secured thereto intermediate the ends thereof, supplemental spring members pivotally secured to said supporting member and extending outwardly therefrom, and independent stops positioned at one side of said supplemental spring members to limit the movement thereof on their pivots.

3. In a device of the character described, a primary spring, a supporting member carried thereby, a pair of superposed supplemental spring members pivoted to said supporting member and extending outwardly therefrom in the same direction, one of said spring members constituting a stop to limit the movement of the other of said spring members on its pivot.

4. In a device of the character described, a primary spring, a supporting member carried thereby, a pair of superposed supplemental spring members pivoted to said supporting member and extending outwardly therefrom in the same direction, one of said spring members constituting a stop to limit the movement of the other of said spring members on its pivot, and means for limiting the movement of said first mentioned spring member.

5. In a device of the character described, a primary spring, a supporting member carried thereby, a plurality of pairs of superposed spring members pivotally secured to said supporting member and extending outwardly therefrom, the pivot ends of one pair of such spring members being positioned to constitute stops limiting the movement of the other spring members.

6. In a device of the character described, a primary spring, a supporting member carried thereby, a pair of supplemental springs pivoted to said supporting member and extending outwardly therefrom, a second pair of supplemental springs pivoted to said supporting member above said first mentioned pair of supplemental springs and at one side of the pivot thereof, the pivots of said second pair of supplemental springs constituting stops to limit the movement of said first mentioned pair of springs on their pivots, and stops for limiting the movement of said second pair of supplemental springs on their pivots.

7. In a spring, a supporting member provided with spaced side walls, a spring member provided with an integral loop at its inner ends positioned between the side walls of said supporting member, a pivot pin passing through the side walls of the supporting member and the loop on the inner end of the spring member, and a stop positioned between the side walls of said supporting member and positioned to engage said spring member after a predetermined movement thereof on its pivot.

8. In a device of the character described, a leaf spring provided with a supporting member rigidly secured thereto intermediate the ends thereof, said supporting member being provided with separated side walls, a plurality of supplemental spring members pivoted with the integral loops at the inner ends thereof positioned between the side walls of the supporting member, pivot pins passing through the side walls of the supporting member and the loops at the inner ends of the spring members, all of said springs being arranged to have a limited movement when on their pivots.

9. In a device of the character described, a primary semi-elliptic spring, a supporting member carried thereby, a plurality of pairs of superposed spring members pivotally secured to said supporting members and extending outwardly therefrom, said pairs of spring members being each pivotally supported above and outside of the pivotal connection of the pair directly therebelow so as to constitute stops to limit the movement thereof, and means for limiting the movement of the topmost pair of spring members.

10. In a device of the character described, a continuous leaf spring, a supplemental leaf spring pivotally connected at one end to said continuous leaf spring, and having its free end resting upon said continuous leaf spring, and means for locking said supplemental spring against movement on its pivot after a predetermined amount of movement of said first mentioned leaf spring.

GRACE CUNNINGHAM SNOW,
*Executor of the Estate of Arthur L. Snow, deceased.*

Witnesses:
J. M. SPEICE,
W. O. CUNNINGHAM.

---

Copies of this patent may be obtained for five cents each, by addressing the "Commissioner of Patents, Washington, D. C."